United States Patent

Hansen et al.

Patent Number: 5,330,543
Date of Patent: Jul. 19, 1994

[54] THIOPHENEAZO DYES WITH A COUPLING COMPONENT OF THE DIAMINOPYRIDINE SERIES

[75] Inventors: Guenter Hansen, Ludwigshafen; Gunther Lamm, Hassloch; Hermann Loeffler, Speyer; Helmut Reichelt, Neustadt; Helmut Degen, Frankenthal; Arno Lange, Bad Durkheim; Clemens Grund, Mannheim, all of Fed. Rep. of Germany

[73] Assignee: BASF Aktiengesellschaft, Ludwigshafen, Fed. Rep. of Germany

[21] Appl. No.: 141,705

[22] Filed: Oct. 27, 1993

Related U.S. Application Data

[63] Continuation of Ser. No. 967,131, Oct. 27, 1992, abandoned.

[30] Foreign Application Priority Data

Nov. 26, 1991 [DE] Fed. Rep. of Germany ....... 4138550

[51] Int. Cl.⁵ .................. C09B 29/042; C09B 29/40; D06P 1/18; D06P 3/54
[52] U.S. Cl. ........................................ 8/662; 534/766; 8/446; 8/532; 8/533; 8/922; 8/693
[58] Field of Search .................... 534/766; 8/466, 532, 8/533, 662, 922

[56] References Cited

U.S. PATENT DOCUMENTS

| Re. 29,640 | 5/1978 | Lamm et al. | 534/773 X |
|---|---|---|---|
| 4,016,152 | 4/1977 | Denhert et al. | 534/766 |
| 4,668,775 | 5/1987 | Bergmann et al. | 534/766 X |
| 4,855,412 | 8/1989 | Dehnert et al. | 534/766 |
| 4,855,413 | 8/1989 | Dehnert et al. | 534/766 |
| 4,929,720 | 5/1990 | Hansen, II et al. | 534/765 X |
| 4,939,118 | 7/1990 | Etzbach et al. | 503/227 |
| 4,965,346 | 10/1990 | Dehnert et al. | 534/766 |
| 5,151,506 | 9/1992 | Bach et al. | 534/772 |

FOREIGN PATENT DOCUMENTS

| 193885 | 9/1986 | European Pat. Off. |
| 201896 | 11/1986 | European Pat. Off. |
| 0214445 | 3/1987 | European Pat. Off. |
| 346729 | 12/1989 | European Pat. Off. |

*Primary Examiner*—Mary C. Lee
*Assistant Examiner*—Fiona T. Powers
*Attorney, Agent, or Firm*—Oblon, Spivak, McClelland, Maier & Neustadt

[57] ABSTRACT

Azo dyes having the formula

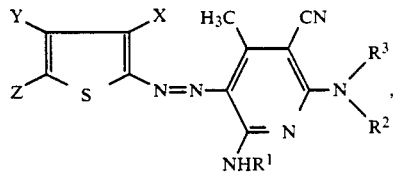

wherein the substituents are as defined in the specification and are useful for dyeing or printing textile materials.

12 Claims, No Drawings

THIOPHENEAZO DYES WITH A COUPLING COMPONENT OF THE DIAMINOPYRIDINE SERIES

This application is a continuation of application Ser. No. 07/967,131, filed on Oct. 27, 1992, now abandoned.

The present invention relates to novel azo dyes of formula I

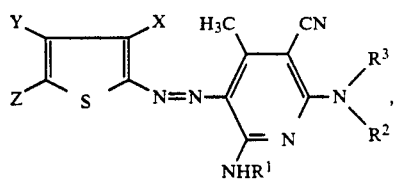

where
X is cyano or a radical of the formula $COOQ^1$ or $CONQ^1Q^2$, wherein $Q^1$ and $Q^2$ are identical or different and singly are, independently of one another, substituted or unsubstituted $C_1$–$C_{12}$-alkyl with or without interruption by from 1 to 3 oxygen atoms in ether function, $C_5$–$C_7$-cycloalkyl, $C_3$–$C_4$-alkenyl, or substituted or unsubstituted phenyl or together are, together with the nitrogen atom joining them, a 5-or 6-membered saturated heterocyclic radical with or without further hetero atoms or else $Q^2$ may be hydrogen, Y is $C_1$–$C_6$-alkoxy, $C_1$–$C_6$-alkylthio, $C_1$–$C_6$-alkylsulfonyl, halogen, substituted or unsubstituted phenoxy, substituted or unsubstituted phenylthio or substituted or unsubstituted phenylsulfonyl, Z is cyano, nitro, substituted or unsubstituted phenylsulfonyl, $C_1$–$C_6$-alkylsulfonyl, formyl or a radical of the formula —CH=T, wherein T is the radical of an acidic-CH compound, and $R^1$, $R^2$ and $R^3$ are identical or different and singly are, independently of one another, substituted or unsubstituted $C_1$–$C_{12}$-alkyl, with or without interruption by from 1 to 3 oxygen atoms in ether function, $C_5$–$C_7$-cycloalkyl, substituted or unsubstituted phenyl, $C_3$–$C_6$-alkenyl, substituted or unsubstituted benzoyl, $C_1$–$C_8$-alkanoyl, $C_1$–$C_6$-alkylsulfonyl or substituted or unsubstituted phenylsulfonyl or $R^2$ and $R^3$ together are, together with the nitrogen atom joining them, a 5- or 6-membered saturated heterocyclic radical with or without further hetero atoms, excepting the following compounds:

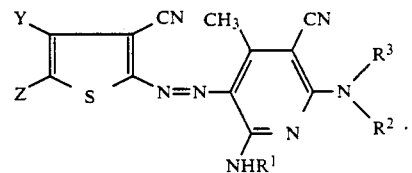

A) Y=chlorine, Z=formyl, $R^1$=$C_3H_6OC_2H_4OC_6H_5$, $R^2$, $R^3$=$CH_3$,
B) Y=chlorine, Z=(NC)$_2$C=CH—, $R^1$=$C_3H_6OC_2H_5$, $R^2$, $R^3$=$C_2H_5$,
C) Y=chlorine, Z=(NC)$_2$C=CH—, $R^1$=$C_3H_6OC_2H_4OC_6H_5$, $R^2$, $R^3$=$C_2H_5$,
D) Y=chlorine, Z=(NC)$_2$C=CH—, $R^1$=$C_4H_8OC_4H_9$, $R^2$, $R^3$=$C_2H_5$,
E) Y=chlorine, Z=(NC)$_2$C=CH—, $R^1$=$C_3H_6OC_2H_4OC_6H_5$, $R^2$, $R^3$=$C_3H_7$,
F) Y=chlorine, Z=$C_4H_9OOC(NC)C$=CH—, $R^1$=$C_3H_6OC_2H_5$, $R^2$, $R^3$=$C_2H_5$,
G) Y=chlorine, Z=$C_4H_9OOC(NC)C$=CH—, $R^1$=$C_3H_6OC_2H_4OC_6H_5$, $R^2$, $R^3$=$C_3H_7$,
H) Y=$OC_2H_5$, Z=$C_2H_5OOC(NC)C$=CH—, $R^1$=$C_3H_6OCH_3$, $R^2$, $R^3C_2H_4OCH_3$,
J) Y=$OC_2H_5$, Z=$C_2H_5OOC(NC)C$=CH—, $R^1$=$C_3H_6OC_2H_5$, $R^2$, $R^3$=$C_2H_4OCH_3$ and
K) Y=$OC_2H_5$, Z=$C_2H_5OOC(NC)C$=CH—, $R^1$=$C_4H_9$, $R^2$, $R^3$=$C_2H_4OCH_3$, and to a process for dyeing or printing textile materials and dyes based on thienylazopyridines.

U.S. Pat. No. 4,939,118, which concerns a process for the thermal transfer of azo dyes having a coupling component of the diaminopyridine series, also describes the transfer of the dyes mentioned above under the exceptions A) to K). However, nowhere does the cited document say that these dyes are also suitable for textile application.

It is true that EP-A-201 896 discloses similar dyes for textile application, but these dyes have in each case only primary amino groups on the pyridine ring. Moreover, it has been found that the dyes mentioned in EP-A-201 896 have deficiencies in their application properties.

It is an object of the present invention to provide novel azo dyes on a thienylazopyridine basis which are advantageously useful for dyeing textile fabric. The novel dyes shall in particular possess a good hot light fastness.

We have found that this object is achieved by the azo dyes of formula I defined at the beginning.

Any alkyl and alkenyl appearing in the abovementioned formula I may be not only straight-chain but also branched.

Any substituted phenyl groups appearing in the abovementioned formula I may have as substituents for example $C_1$–$C_4$-alkyl, chlorine, bromine, nitro or $C_1$–$C_4$-alkoxy. These phenyl radicals have in general from 1 to 3 substituents.

Any substituted alkyl appearing in the abovementioned formula I may have as substituents for example, hydroxyl, cyclohexyloxy, phenoxy, $C_1$–$C_4$-alkoxycarbonyl, cyano, cyclohexyl or phenyl. These alkyl radicals have in general 1 or 2 substituents.

$R^1$, $R^2$, $R^3$, $A^1$, $A^2$, $A^3$, $Q^1$ and $Q^2$ are each for example methyl, ethyl, propyl, isopropyl, butyl, isobutyl, sec-butyl, pentyl, isopentyl, neopentyl, tert-pentyl, hexyl, 2-methylpentyl, hexyl, heptyl, octyl, 2-ethylhexyl, nonyl, decyl, undecyl, dodecyl, 2-methoxyethyl, 2-ethoxyethyl, 2-propoxyethyl, 2-butoxyethyl, 2-isobutoxyethyl, 2- or 3-methoxypropyl, 1-methoxyprop-2-yl, 2- or 3-ethoxypropyl or 2-or 3-propoxypropyl, 3,6-dioxaheptyl, 3,6-dioxaoctyl, 4,7-dioxaoctyl, 4,7-dioxanonyl, 4,8-dioxadecyl, 4,6-dioxaundecyl, 3,6,9-trioxaundecyl, 4,7,10-trioxaundecyl, 4,7,10-trioxadodecyl, 2-hydroxyethyl, 2-hydroxypropyl, 3-hydroxypropyl, 4-hydroxybutyl, 2-cyclohexyloxyethyl, 2- or 3-cyclohexyloxypropyl, 2- or 4-cyclohexyloxybutyl, 2-phenoxyethyl, 2-phenoxypropyl, 3-phenoxypropyl, 4-phenoxybutyl, 2-methoxycarbonylethyl, 2-ethoxycarbonylethyl, 2- or 3-methoxycarbonylpropyl, 2- or 3-ethoxycarbonylpropyl, 2- or 3-butoxycarbonylpropyl, 4-methoxycarbonylbutyl, 4-ethoxycarbonylbutyl, 2-cyanoethyl, 2- or 3-cyanopropyl, 4-cyanobutyl, 2-cyclohexylalkyl, 2- or 3-cyclohexylpropyl, benzyl, 1- or 2-phenylethyl, cyclopentyl, cyclohexyl, cycloheptyl, phenyl, 2-methylphenyl, 4-methylphenyl, 4-ethylphenyl, 4-isopropylphenyl, 4-butylphenyl, 2,4-dimethylphenyl, 2,4,6-trimethylphenyl, 4-cyanophenyl, 4-chlorophenyl, 2,4-dichlorophenyl, 2-bromophenyl, 3-nitrophenyl, 4-nitrophenyl, prop-2-en-1-yl, 2-methylprop-2-en-1-yl, but-2-en-1-yl or but-3-en-1-yl.

Y is for example methylthio, ethylthio, propylthio, isopropylthio, butylthio, isobutylthio, pentylthio, hexylthio, phenylthio, 2-methylphenylthio, 2-methoxyphenylthio, 2-chlorophenylthio, methoxy, ethoxy, propoxy, isopropoxy, butoxy, isobutoxy, sec-butoxy, pentyloxy, isopentyloxy, neopentyloxy, tert-pentyloxy, hexyloxy, 2-methylpentyloxy, phenoxy, 2-, 3- or 4-methylphenoxy, 2-, 3- or 4-methoxyphenoxy, 2, 3- or 4-chlorophenoxy, fluorine, chlorine or bromine.

$R^1$, $R^2$, $R^3$, $A^1$, $A^2$, $A^3$ and Y and also Z may each also be for example methylsulfonyl, ethylsulfonyl, propylsulfonyl, isopropylsulfonyl, butylsulfonyl, isobutylsulfonyl, sec-butylsulfonyl, pentylsulfonyl, isopentylsulfonyl, neopentylsulfonyl, hexylsulfonyl, phenylsulfonyl, 2-methylphenylsulfonyl, 2-methoxyphenylsulfonyl or 2-chlorophenylsulfonyl.

A 5- or 6-membered saturated heterocyclic radical formed by $Q^2$ and $Q^2$ together with the nitrogen atom joining them, with or without further hetero atoms, is for example pyrrolidinyl, piperidinyl, morpholinyl, thiomorpholinyl, thiomorpholinyl S,S-dioxide, piperazinyl or N-($C_1$-$C_4$-alkyl)piperazinyl, such as N-methyl- or N-ethylpiperazinyl.

$R^1$, $R^2$, $R^3$, $A^1$, $A^2$ and $A^3$ may each also be for example formyl, acetyl, propionyl, butyryl, isobutyryl, pentanoyl, hexanoyl, heptanoyl, octanoyl, 2-ethylhexanoyl, benzoyl, 2-, 3- or 4-methylbenzoyl, 2-, 3- or 4-methoxybenzyl or 2-, 3- or 4-chlorobenzoyl.

When Z is —CH=T, wherein T is derived from an acidic-CH compound $H_2T$, suitable acidic-CH compounds $H_2T$ are for example compounds of the formulae IIa to IIg

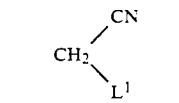

(IIa)

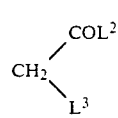

(IIb)

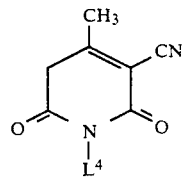

(IIc)

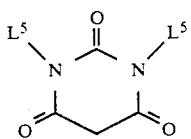

(IId)

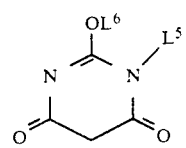

(IIe)

-continued

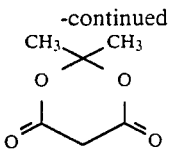

(IIf)

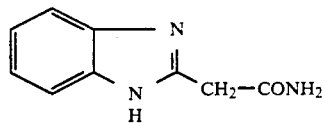

(IIg)

where
$L^1$ is cyano, nitro, $C_1$-$C_4$-alkanoyl, substituted or unsubstituted benzoyl, $C_1$-$C_4$-alkylsulfonyl, substituted or unsubstituted phenylsulfonyl, carboxyl, $C_1$-$C_4$-alkoxycarbonyl, phenoxycarbonyl, carbamoyl, $C_1$-$C_4$-mono- or -dialkylcarbamoyl, substituted or unsubstituted phenylcarbamoyl, substituted or unsubstituted phenyl, benzothiazol-2-yl, benzimidazol-2-yl, 5-phenyl-1,3,4-thiadiazol-2-yl or 2-hydroxyquinoxalin-3-yl, $L^2$ is $C_1$-$C_4$-alkyl or $C_1$-$C_4$-alkoxy, $L^3$ is $C_1$-$C_4$-alkoxycarbonyl, phenylcarbamoyl or benzimidazol-2-yl, $L^4$ is hydrogen or $C_1$-$C_4$-alkyl, $L^5$ is hydrogen, $C_1$-$C_4$-alkyl or phenyl, and $L^6$ is $C_1$-$C_4$-alkyl.

Of particular suitability is a radical derived from the formula IIa or IIb where $L^1$ is cyano, $C_1$-$C_4$ alkanoyl or $C_1$-$C_4$-alkoxycarbonyl, is $C_1$-$C_4$-alkyl or $C_1$-$C_4$-alkoxy, and $L^3$ is $C_1$-$C_4$-alkoxycarbonyl.

Of very particular suitability is a radical derived from the formula IIa or IIb where $L^1$ is cyano or $C_1$-$C_4$ alkoxycarbonyl, $L^2$ is $C_1$-$C_4$-alkoxy and $L^3$ is $C_1$-$C_4$-alkoxycarbonyl.

Preference is given to the azo dyes of the formula I where

X is cyano or a radical of the formula $COOQ^1$ where $Q^1$ is $C_1$-$C_4$-alkyl, Y is $C_1$-$C_4$-alkoxy, $C_1$-$C_4$-alkylthio, $C_1$-$C_4$-alkylsulfonyl, chlorine, bromine, phenoxy, phenylthio or phenylsulfonyl, Z is cyano, formyl or a radical of the formula —CH=T, wherein T is as defined above, and $R^1$, $R^2$ and $R^3$ are each, independently of the others, $C_1$-$C_8$-alkyl, which may be substituted and may be interrupted by 1 or 2 oxygen atoms in ether function, $C_5$-$C_7$-cycloalkyl or $C_3$-$C_6$-alkenyl or $R^1$ and $R^2$ together are, together with the nitrogen atom joining them, a 5- or 6-membered saturated heterocyclic radical with or without further hetero atoms.

Particular preference is given to azo dyes of formula I where

X is cyano,

Y is ethoxy, $C_1$-$C_4$-alkylthio, chlorine, bromine, phenoxy or phenylthio,

Z is formyl or a radical of formula

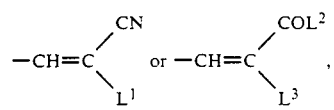

where $L^1$ is cyano, $C_1$–$C_4$-alkanoyl or $C_1$–$C_4$-alkoxycarbonyl, $L^2$ is $C_1$–$C_4$-alkyl or $C_1$–$C_4$-alkoxy, and $L^3$ is $C_1$–$C_4$-alkoxycarbonyl, and $R^1$, $R^2$ and $R^3$ are each, independently of the others, $C_1$–$C_8$-alkyl, which may be substituted and may be interrupted by 1 or 2 oxygen atoms in ether function, or $R^1$ and $R^2$ together are, together with the nitrogen atom joining them, pyrrolidinyl, piperidinyl, morpholinyl, piperazinyl or N-($C_1$–$C_4$-alkyl)piperazinyl.

Of particular interest are azo dyes of formula I where X is cyano and Y is chlorine.

The azo dyes of the formula I can be prepared in a conventional manner. For example, the amine of the formula III

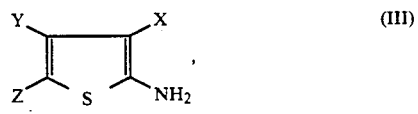

where X, Y and Z are each as defined above, can be diazotized in a conventional manner to form a diazonium salt which can then be coupled with a diaminopyridine of the formula IV

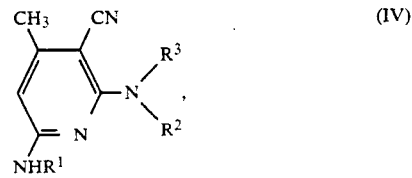

where $R^1$, $R^2$ and $R^3$ are each as defined above.

It is also possible, however, to couple diazonium salts of diazo components of the formula IIIa

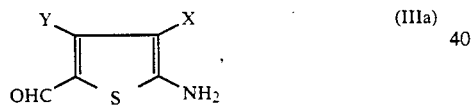

where X and Y are each as defined above, with the diaminopyridines IV to give the azo dyes of the formula I (Z=formyl) and condense the resulting dyes with compounds of the formula $H_2T$ in a conventional manner.

The starting compounds III and IV are known per se or can be prepared by methods known per se, as are described for example in EP-A-193 885 and U.S. Pat. No. 3,853,895.

We have also found that the dyeing of textile materials with azo dyes is advantageously possible on using azo dyes of the formula Ia

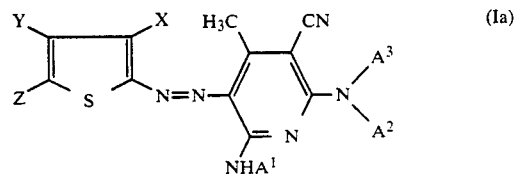

where

X is cyano or a radical of the formula $COOQ^1$ or $CONQ^1Q^2$, wherein $Q^1$ and $Q^2$ are identical or different and singly are, independently of one another, substituted or unsubstituted $C_1$–$C_{12}$-alkyl with or without interruption by from 1 to 3 oxygen atoms in ether function, $C_5$–$C_7$-cycloalkyl, $C_3$–$C_4$-alkenyl, or substituted or unsubstituted phenyl or together are, together with the nitrogen atom joining them, a 5-or 6-membered saturated heterocyclic radical with or without further hetero atoms or else $Q^2$ may be hydrogen, Y is $C_1$–$C_6$-alkoxy, $C_1$–$C_6$-alkylthio, $C_1$–$C_6$-alkylsulfonyl, halogen, substituted or unsubstituted phenoxy, substituted or unsubstituted phenylthio or substituted or unsubstituted phenylsulfonyl, Z is cyano, nitro, substituted or unsubstituted phenylsulfonyl, $C_1$–$C_6$-alkylsulfonyl, formyl or a radical of the formula —CH=T, wherein T is the radical of an acidic-CH compound, and $A^1$, $A^2$ and $A^3$ are identical or different and singly are, independently of one another, substituted or unsubstituted $C_1$–$C_{12}$-alkyl, with or without interruption by from 1 to 3 oxygen atoms in ether function, $C_5$–$C_7$-cycloalkyl, substituted or unsubstituted phenyl, $C_3$–$C_6$-alkenyl, substituted or unsubstituted benzoyl, $C_1$–$C_8$-alkanoyl, $C_1$–$C_6$-alkylsulfonyl or substituted or unsubstituted phenylsulfonyl or $A^2$ and $A^3$ together are, together with the nitrogen atom joining them, a 5- or 6-membered saturated heterocyclic radical with or without further hetero atoms.

Suitable textile materials are for example polyesters in the various use forms (e.g. woven, knitted, yarn or fiber) or mixtures thereof with other fibers.

It is particularly advantageous to use the azo dyes of the formula Ia together with UV absorbers. Suitable UV absorbers are for example those of the formula V or VI

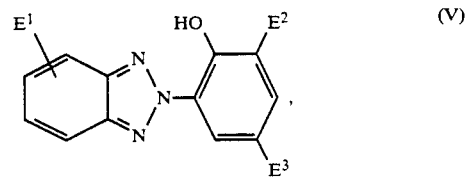

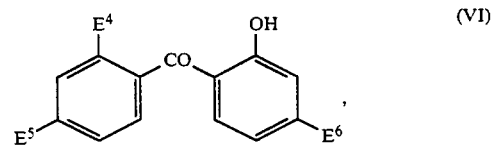

where $E^1$ is hydrogen or chlorine, $E^2$ and $E^3$ are identical or different and each is, independently of the other, hydrogen or $C_1$–$C_8$-alkyl which may be substituted by phenyl, $E^4$ is hydrogen or hydroxyl, and $E^5$ and $E^6$ are identical or different and each is, independently of the other, hydrogen, hydroxyl, or $C_1$–$C_6$-alkoxy which may be substituted by hydroxyl, $C_1$–$C_4$-alkoxy, $C_1$–$C_4$-alkanoyloxy or benzoyloxy.

Of particular suitability are UV absorbers of the formula Va, Vb, VIa or VIb

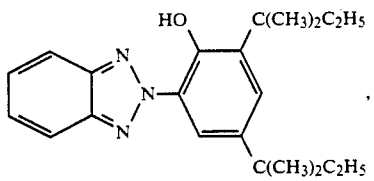 (Va)

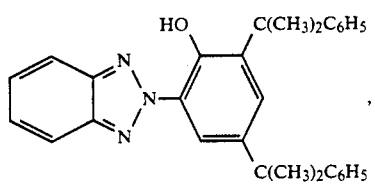 (Vb)

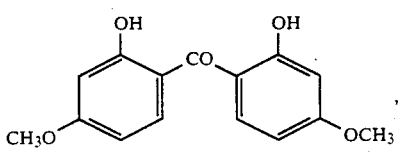 (VIa)

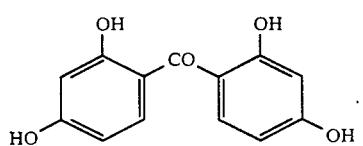 (VIb)

These UV absorbers can be used alone or else mixed with one another. More particularly, it is possible to use mixtures of different species of the formula V or VI or else mixtures of compounds of the formulae V and VI.

In general, UV absorber is employed in an amount of from 1 to 8% by weight, preferably from 2 to 5% by weight, each percentage being based on the weight of azo dye.

The azo dyes of the formula Ia have an advantageous application property profile. More particularly, they have an excellent hot light fastness. They differ from the dyes disclosed in EP-A-201 896 in achieving an advantageous degree of exhaustion.

The Examples which follow will further illustrate the invention.

GENERAL DYEING METHOD

This method is suitable for applying the dyes more particularly described hereinafter.

10 g of polyester fabric are introduced at 50° C. into 200 ml of a dyeing liquor containing 0.5% by weight, based on the polyester fabric, of a dye preparation and adjusted with acetic acid to pH 4.5. The fabric is treated at 50° C. for 5 minutes, the temperature of the liquor is then raised over 30 minutes to 130° C. and maintained at that level for 60 minutes, and the liquor is then cooled down over 20 minutes to 60° C.

The dyed polyester fabric is then reduction cleared by treating it at 65° C. for 15 minutes in 200 ml of a liquor containing per liter 5 ml of 30% strength by weight sodium peroxide solution, 3 g of sodium dithionite and 1 g of an addition product of 48 mol of ethylene oxide with 1 mol of castor oil. Finally, the fabric is rinsed, neutralized with dilute acetic acid, rinsed once more and dried.

The abovementioned dye preparation contains 40% by weight of azo dye and 60% by weight of dispersant based on ligninsulfonate, each percentage being based on the weight of the preparation. The dye preparation may additionally contain from 1 to 8% by weight, based on the weight of azo dye, of one of the above-described UV absorbers.

EXAMPLE 1

To 17.5 g of ice were added 94 g of concentrated sulfuric acid, and the mixture was cooled down to 20° C. and then diluted with 15 g of glacial acetic acid. It was then cooled down to 0°-5° C. and 32 g of 44% by weight of nitrosylsulfuric acid were added. To this mixture were added 18.7 g of 2-amino-3-cyano-4-chloro-5-formylthiophene in the course of about 15 minutes with cooling at from 0° to 5° C., and the reaction mixture was subsequently stirred at from 0° to 5° C. for 4 hours. The solution was stirred out onto a mixture prepared as follows:

37.6 g of the pyridine of the formula

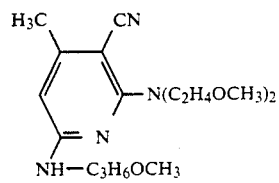

were dissolved in water with hydrochloric acid.

The solution was then cooled down with ice to from 0° to −5° C.

During the addition of the diazo component the temperature of the coupling mixture was maintained with ice at ≦3° C. The pH was maintained with sodium acetate within the range from 0.3 to 2.0. The coupling was complete within a short time. The precipitated dye of the formula

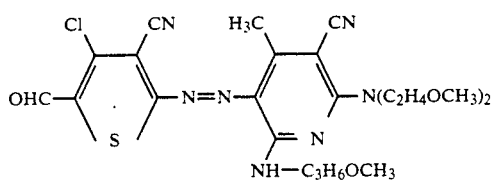

was separated off, washed salt-free and dried.

This gave 50.7 g of the dye in the form of a dark red powder which dyes polyester in a bluish red shade.

The method of Example 1 also gives the dyes listed below in Tables 1 and 2.

TABLE 1

[Structure: chemical formula showing a chlorothiophene-aldehyde connected via azo group (N=N) to a pyridine system with CN, CH3, NR2R3 substituents and NH-R1 group]

| Ex. No. | R¹ | R² | R³ | Hue on polyester |
|---|---|---|---|---|
| 2 | $CH_3$ | $C_2H_4OCH_3$ | $C_2H_4OCH_3$ | bordeaux |
| 3 | $C_2H_5$ | $C_2H_4OCH_3$ | $C_2H_4OCH_3$ | bordeaux |
| 4 | $C_3H_7(n)$ | $C_2H_4OCH_3$ | $C_2H_4OCH_3$ | bordeaux |
| 5 | $C_4H_9$ | $C_2H_4OCH_3$ | $C_2H_4OCH_3$ | bordeaux |
| 6 | $CH_2CH=CH_2$ | $C_2H_4OCH_3$ | $C_2H_4OCH_3$ | bordeaux |
| 7 | $C_2H_4OCH_3$ | $C_2H_4OCH_3$ | $C_2H_4OCH_3$ | bordeaux |
| 8 | $C_3H_6OCH_3$ | $C_2H_4OCH_3$ | $C_2H_4OCH_3$ | bordeaux |
| 9 | $C_2H_4OC_2H_5$ | $C_2H_4OCH_3$ | $C_2H_4OCH_3$ | bordeaux |
| 10 | $C_3H_6OC_2H_5$ | $C_2H_4OCH_3$ | $C_2H_4OCH_3$ | bordeaux |
| 11 | $C_2H_4OH$ | $C_2H_4OCH_3$ | $C_2H_4OCH_3$ | bordeaux |
| 12 | $C_3H_6OH$ | $C_2H_4OCH_3$ | $C_2H_4OCH_3$ | bordeaux |
| 13 | $C_2H_4OCOCH_3$ | $C_2H_4OCH_3$ | $C_2H_4OCH_3$ | bordeaux |
| 14 | $C_3H_6OCOCH_3$ | $C_2H_4OCH_3$ | $C_2H_4OCH_3$ | bordeaux |
| 15 | $C_3H_6OCH_2C_6H_5$ | $C_2H_4OCH_3$ | $C_2H_4OCH_3$ | bordeaux |
| 16 | $C_3H_6OC_2H_4C_6H_5$ | $C_2H_4OCH_3$ | $C_2H_4OCH_3$ | bordeaux |
| 17 | $C_3H_6OC_2H_4OC_6H_5$ | $C_2H_4OCH_3$ | $C_2H_4OCH_3$ | bordeaux |
| 18 | $C_3H_6OC_6H_{11}$ | $C_2H_4OCH_3$ | $C_2H_4OCH_3$ | bordeaux |
| 19 | $C_2H_4OCH_3$ | $C_2H_5$ | $C_2H_5$ | bordeaux |
| 20 | $C_3H_6OCH_3$ | $C_2H_5$ | $C_2H_5$ | bordeaux |
| 21 | $C_3H_6OCOCH_3$ | $C_2H_5$ | $C_2H_5$ | bordeaux |
| 22 | $C_3H_6OC_2H_5$ | $C_2H_5$ | $C_2H_5$ | bordeaux |
| 23 | $C_2H_4C_6H_5$ | $C_2H_4OCH_3$ | $C_2H_4OCH_3$ | bordeaux |
| 24 | $CH_2CH(OH)C_6H_5$ | $C_2H_4OCH_3$ | $C_2H_4OCH_3$ | bordeaux |
| 25 | $C_3H_6OCH_2C_6H_5$ | $C_2H_5$ | $C_2H_5$ | bordeaux |
| 26 | $C_3H_6OC_2H_4OC_6H_5$ | $C_2H_5$ | $C_2H_5$ | bordeaux |
| 27 | $C_4H_8OH$ | $C_2H_5$ | $C_2H_5$ | bordeaux |
| 28 | $C_2H_5$ | $(C_2H_4O)_2CH_3$ | $(C_2H_4O)_2CH_3$ | bordeaux |
| 29 | $CH_2CH=CH_2$ | $(C_2H_4O)_2CH_3$ | $(C_2H_4O)_2CH_3$ | bordeaux |
| 30 | $C_2H_5$ | $C_3H_6OCH_3$ | $C_2H_5$ | bordeaux |
| 31 | $C_2H_4C_6H_5$ | $C_2H_4OCH_3$ | $C_2H_4OCH_3$ | bordeaux |
| 32 | $C_3H_6OC_2H_4OCH_3$ | $C_2H_5$ | $C_2H_5$ | bordeaux |
| 33 | $C_3H_6OC_2H_4OCH_3$ | $C_3H_7(n)$ | $C_3H_7(n)$ | bordeaux |
| 34 | $C_3H_6OC_2H_4OCH_3$ | $C_2H_4OCH_3$ | $C_2H_4OCH_3$ | bordeaux |
| 35 | $C_3H_6OC_2H_4OCH_3$ | $CH_3$ | $CH_3$ | bordeaux |
| 36 | $C_3H_6OCH_3$ | $CH_3$ | $CH_3$ | bordeaux |
| 37 | $C_2H_4OCH_3$ | $CH_3$ | $CH_3$ | bordeaux |
| 38 | $CH(C_2H_5)CH_2OH$ | $CH_3$ | $CH_3$ | bordeaux |
| 39 | $CH(C_2H_5)CH_2OH$ | $C_2H_5$ | $C_2H_5$ | bordeaux |
| 40 | $CH(C_2H_5)CH_2OH$ | $C_2H_4OCH_3$ | $C_2H_4OCH_3$ | bordeaux |
| 41 | $C_3H_6OCH_3$ | $C_3H_6OCH_3$ | $C_2H_5$ | bordeaux |
| 42 | $C_3H_6OH$ | $C_2H_4OCH_3$ | $C_2H_4OCH_3$ | bordeaux |
| 43 | $C_3H_6OCOCH_3$ | $C_2H_4OCH_3$ | $C_2H_4OCH_3$ | bordeaux |
| 44 | $CH_2CH=CH_2$ | $CH_3$ | $CH_3$ | bordeaux |
| 45 | $CH_2CH=CH_2$ | $C_2H_5$ | $C_2H_5$ | bordeaux |
| 46 | $CH_2CH(CH_3)OCOCH_3$ | $C_2H_4OCH_3$ | $C_2H_4OCH_3$ | bordeaux |
| 47 | $C_3H_6OC_2H_4OC_6H_5$ | $C_2H_5$ | $C_2H_5$ | bordeaux |
| 48 | $C_3H_6OC_2H_4OC_6H_5$ | $CH_3$ | $C_2H_5$ | bordeaux |
| 49 | $C_3H_6OC_2H_4OC_6H_5$ | $CH_3$ | $C_3H_7(n)$ | bordeaux |
| 50 | $C_3H_6OC_2H_4OC_6H_5$ | $C_2H_5$ | $C_3H_6OCH_3$ | bordeaux |
| 51 | $C_3H_6OC_2H_4OC_6H_5$ | $C_2H_4OCH_3$ | $C_2H_4OCH_3$ | bordeaux |
| 52 | $CH(CH_3)C_2H_5$ | $C_2H_4OCH_3$ | $C_2H_4OCH_3$ | bordeaux |
| 53 | $CH(CH_3)C_2H_5$ | $C_2H_5$ | $C_2H_5$ | bordeaux |
| 54 | $CH(CH_3)CH_2OCH_3$ | $C_2H_5$ | $C_2H_5$ | bordeaux |
| 55 | $C(CH_3)_2C_2H_5$ | $C_2H_4OCH_3$ | $C_2H_4OCH_3$ | bordeaux |
| 56 | $CH(CH_3)CH_2OCH_3$ | $C_2H_5$ | $C_3H_6OCH_3$ | bordeaux |
| 57 | $CH(CH_3)CH_2OCH_3$ | $C_3H_7$ | $C_3H_6OCH_3$ | bordeaux |
| 58 | $CH(CH_3)CH_2OCH_3$ | $C_2H_5$ | $C_3H_6OC_2H_4OCH_3$ | bordeaux |
| 59 | $CH(CH_3)CH_2OCH_3$ | $C_3H_7$ | $C_3H_6OC_2H_4OCH_3$ | bordeaux |
| 60 | $CH(CH_3)CH_2OCH_3$ | $C_2H_5$ | $C_3H_6OC_2H_4OC_2H_5$ | bordeaux |
| 61 | $CH(CH_3)CH_2OCH_3$ | $C_3H_7$ | $C_3H_6OC_2H_4OC_2H_5$ | bordeaux |
| 62 | $CH(CH_3)CH_2OCH_3$ | $C_2H_4OCH_3$ | $C_2H_4OCH_3$ | bordeaux |
| 63 | $CH(CH_3)CH_2OCH_3$ | $C_3H_6OCH_3$ | $C_3H_6OCH_3$ | bordeaux |

TABLE 2

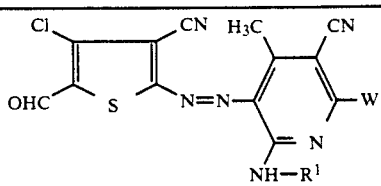

| Ex. No. | R¹ | W | Hue on polyester |
|---|---|---|---|
| 64 | $C_2H_4OH$ | —N(morpholino)O | bordeaux |
| 65 | $C_3H_6OH$ | —N(morpholino)O | bordeaux |
| 66 | $C_3H_6OCH_3$ | —N(morpholino)O | bordeaux |
| 67 | $C_3H_6OCOCH_3$ | —N(morpholino)O | bordeaux |
| 68 | $C_3H_6OC_2H_4OCH_3$ | —N(morpholino)O | bordeaux |
| 69 | $C_3H_6OC_4H_8OH$ | —N(morpholino)O | bordeaux |
| 70 | $C_3H_6OC_2H_4OC_6H_5$ | —N(morpholino)O | bordeaux |
| 71 | $C_3H_6OC_4H_8OH$ | —N(morpholino)O | bordeaux |
| 72 | $CH(CH_3)CH_2OCH_3$ | —N(morpholino)O | bordeaux |

EXAMPLE 73

4.6 g of the dye of the formula

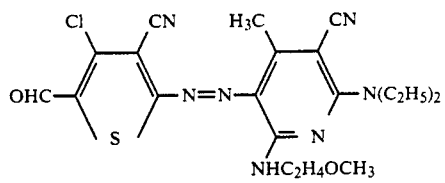

(Example 19) were stirred for 24 hours at room temperature in 80 ml of propanol together with 1.32 g of malodinitrile and 1.0 g of sodium acetate. This is followed by filtering off with suction, washing with propanol and drying. This gave 5.0 g of the dye of the formula

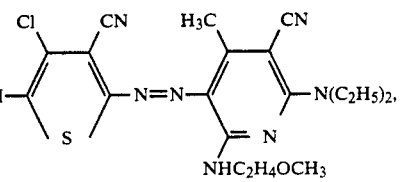

which dyes polyester material in a blue shade of very good fastness.

EXAMPLE 74

5.34 g of the dye of the formula

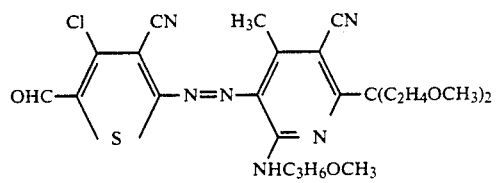

(Example 8) were reacted with 4.23 g of butyl cyanoacetate as described in Example 73. This gave 5.8 g of the dye of the formula

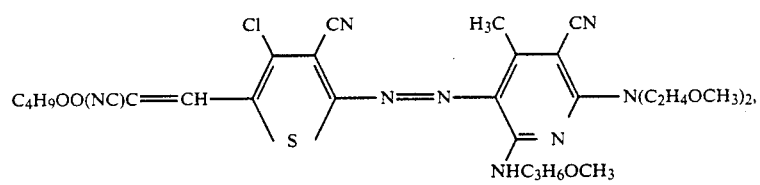

which dyes polyester material in a fast blue shade.

EXAMPLE 75

240 ml of glacial acetic acid and 80 ml of propionic acid were mixed and cooled down to 0° C. 80 g of 80% by weight sulfuric acid were then added. Then 29.1 g of the diazo component of the formula

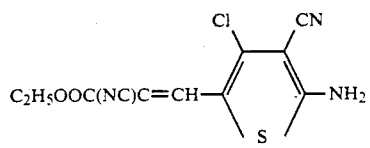

were added at from −3° to +3° C. in the form of a finely ground powder. The mixture was stirred at from −3° to ±5° C. for 15 minutes, at which point 33 g of 42% by weight nitrosylsulfuric acid were added dropwise at that temperature with cooling and thorough stirring in the course of from 15 to 20 minutes. The reaction mixture was subsequently stirred at from 0° to 5° C. for 2.5 hours and then combined with a 0°–5° C. solution of 30.3 g of the coupling component of the formula

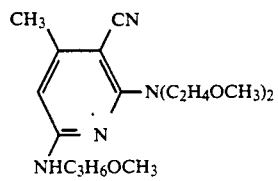

in 200 ml of glacial acetic acid and 50 ml of propionic acid. Then 90 g of anhydrous sodium acetate were added with stirring at from 0° to 5° C. The resulting dye of the formula

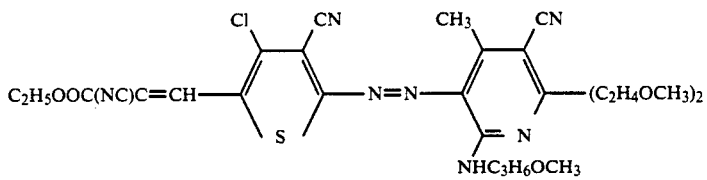

was precipitated with water and isolated. It constituted 56 g of a bluish black powder which gives a blue solution in N,N-dimethylformamide and dyes polyester fabric in a blue shade having very good fastness properties.

The method of Examples 73 to 75 can be used to obtain the dyes listed below in Tables 3 and 4.

TABLE 3

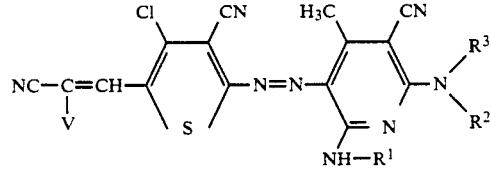

| Ex. No. | $R^1$ | $R^2$ | $R^3$ | V | Hue on polyester |
|---|---|---|---|---|---|
| 76 | $CH_3$ | $C_2H_4OCH_3$ | $C_2H_4OCH_3$ | CN | blue |
| 77 | $C_2H_5$ | $C_2H_4OCH_3$ | $C_2H_4OCH_3$ | CN | blue |
| 78 | $C_3H_7(n)$ | $C_2H_4OCH_3$ | $C_2H_4OCH_3$ | CN | blue |
| 79 | $C_4H_9$ | $C_2H_4OCH_3$ | $C_2H_4OCH_3$ | CN | blue |
| 80 | $CH_2CH=CH_2$ | $C_2H_4OCH_3$ | $C_2H_4OCH_3$ | CN | blue |
| 81 | $C_2H_4OCH_3$ | $C_2H_4OCH_3$ | $C_2H_4OCH_3$ | CN | blue |
| 82 | $C_3H_6OCH_3$ | $C_2H_4OCH_3$ | $C_2H_4OCH_3$ | CN | blue |
| 83 | $C_2H_4OC_2H_5$ | $C_2H_4OCH_3$ | $C_2H_4OCH_3$ | CN | blue |
| 84 | $C_2H_4OC_2H_5$ | $C_2H_4OCH_3$ | $C_2H_4OCH_3$ | CN | blue |
| 85 | $C_2H_4OH$ | $C_2H_4OCH_3$ | $C_2H_4OCH_3$ | CN | blue |
| 86 | $C_3H_6OH$ | $C_2H_4OCH_3$ | $C_2H_4OCH_3$ | CN | blue |
| 87 | $C_2H_4OCOCH_3$ | $C_2H_4OCH_3$ | $C_2H_4OCH_3$ | CN | blue |
| 88 | $C_3H_6OCOCH_3$ | $C_2H_4OCH_3$ | $C_2H_4OCH_3$ | CN | blue |
| 89 | $C_3H_6OCH_2C_6H_5$ | $C_2H_4OCH_3$ | $C_2H_4OCH_3$ | CN | blue |
| 90 | $C_3H_6C_2H_4C_6H_5$ | $C_2H_4OCH_3$ | $C_2H_4OCH_3$ | CN | blue |
| 91 | $C_3H_6OC_2H_4OC_6H_5$ | $C_2H_4OCH_3$ | $C_2H_4OCH_3$ | CN | blue |
| 92 | $C_3H_6OC_6H_{11}$ | $C_2H_4OCH_3$ | $C_2H_4OCH_3$ | CN | blue |
| 93 | $C_2H_4OCH_3$ | $C_2H_5$ | $C_2H_5$ | CN | blue |
| 94 | $C_2H_4OCH_3$ | $C_2H_5$ | $C_2H_5$ | $COOC_4H_9$ | blue |
| 95 | $C_2H_4OCH_3$ | $C_2H_5$ | $C_2H_5$ | $COOC_2H_5$ | blue |
| 96 | $C_2H_4OCH_3$ | $C_2H_5$ | $C_2H_5$ | COOH | blue |
| 97 | $C_2H_4OCH_3$ | $C_2H_5$ | $C_2H_5$ | $CONH_2$ | blue |
| 98 | $C_2H_4OCH_3$ | $C_2H_5$ | $C_2H_5$ | $CONHCH_3$ | blue |
| 99 | $C_3H_6OCOCH_3$ | $C_2H_5$ | $C_2H_5$ | CN | blue |
| 100 | $C_3H_6OCH_3$ | $C_2H_5$ | $C_2H_5$ | CN | blue |
| 101 | $C(CH_3)_3$ | $C_2H_5$ | $C_2H_5$ | CN | blue |
| 102 | $C_2H_4C_6H_5$ | $C_2H_4OCH_3$ | $C_2H_4OCH_3$ | CN | blue |
| 103 | $CH_2CH(OH)C_6H_5$ | $C_2H_4OCH_3$ | $C_2H_4OCH_3$ | CN | blue |
| 104 | $C_3H_6OCH_2C_6H$ | $C_2H_5$ | $C_2H_5$ | CN | blue |
| 105 | $C_4H_8OH$ | $C_2H_5$ | $C_2H_5$ | CN | Blue |
| 106 | $C_2H_5$ | $(C_2H_4O)_2CH_3$ | $(C_2H_4O)_2CH_3$ | CN | blue |
| 107 | $CH_2CH=CH_2$ | $(C_2H_4O)_2CH_3$ | $(C_2H_4O)_2CH_3$ | CN | blue |
| 108 | $C_3H_6OC_2H_4OCH_3$ | $C_2H_5$ | $C_2H_5$ | CN | blue |
| 109 | $C_3H_6OC_2H_4OCH_3$ | $C_3H_7(n)$ | $C_3H_7(n)$ | CN | blue |
| 110 | $C_3H_6OC_2H_4OCH_3$ | $C_2H_4OCH_3$ | $C_2H_4OCH_3$ | CN | blue |
| 111 | $C_3H_6OC_2H_4OCH_3$ | $CH_3$ | $CH_3$ | CN | blue |
| 112 | $C_3H_6OCH_3$ | $CH_3$ | $CH_3$ | CN | blue |
| 113 | $C_2H_4OCH_3$ | $CH_3$ | $CH_3$ | CN | blue |
| 114 | $CH(C_2H_5)CH_2OH$ | $CH_3$ | $CH_3$ | CN | blue |
| 115 | $CH(C_2H_5)CH_2OH$ | $C_2H_5$ | $C_2H_5$ | CN | blue |

TABLE 3-continued

[Structure: NC-C(=CH-)...V on left ring with Cl, CN, S, and azo-linked right pyridine ring with H₃C, CN, NH-R¹, N(R²)(R³)]

| Ex. No. | R¹ | R² | R³ | V | Hue on polyester |
|---|---|---|---|---|---|
| 116 | CH(C₂H₅)CH₂OH | C₂H₄OCH₃ | C₂H₄OCH₃ | CN | blue |
| 117 | C₃H₆OH | C₂H₄OCH₃ | C₂H₄OCH₃ | CN | blue |
| 118 | C₃H₆OCOCH₃ | C₂H₄OCH₃ | C₂H₄OCH₃ | CN | blue |
| 119 | CH₂CH=CH₂ | CH₃ | CH₃ | CN | blue |
| 120 | CH₂CH=CH₂ | C₂H₅ | C₂H₅ | CN | blue |
| 121 | CH₂CH(CH₃)OCOCH₃ | C₂H₄OCH₃ | C₂H₄OCH₃ | CN | blue |
| 122 | C(CH₃)₃ | C₂H₄OCH₃ | C₂H₄OCH₃ | COOC₄H₉ | blue |
| 123 | CH₃ | C₂H₄OCH₃ | C₂H₄OCH₃ | COOC₄H₉ | blue |
| 124 | C₂H₅ | C₂H₄OCH₃ | C₂H₄OCH₃ | COOC₄H₉ | blue |
| 125 | C₃H₇(n) | C₂H₄OCH₃ | C₂H₄OCH₃ | COOC₂H₅ | blue |
| 126 | CH₂CH=CH₂ | C₂H₄OCH₃ | C₂H₄OCH₃ | COOC₄H₉ | blue |
| 127 | C₂H₄OCH₃ | C₂H₄OCH₃ | C₂H₄OCH₃ | COOC₄H₉ | blue |
| 128 | CH₂CH=CH₂ | C₂H₅ | C₂H₅ | COOC₂H₅ | blue |
| 129 | C₂H₄OC₂H₅ | C₂H₅OCH₃ | C₂H₄OCH₃ | COOC₂H₅ | blue |
| 130 | C₃H₆OC₂H₅ | C₂H₄OCH₃ | C₂H₄OCH₃ | COOC₃H₇ | blue |
| 131 | C₂H₄OH | C₂H₄OCH₃ | C₂H₄OCH₃ | COOC₃H₇ | blue |
| 132 | C₃H₆OH | C₂H₄OCH₃ | C₂H₄OCH₃ | COOC₄H₉ | blue |
| 133 | C₂H₄OCOCH₃ | C₂H₄OCH₃ | C₂H₄OCH₃ | COOC₄H₉ | blue |
| 134 | C₃H₆OCOCH₃ | C₂H₄OCH₃ | C₂H₄OCH₃ | COOC₄H₉ | blue |
| 135 | C₂H₅ | C₂H₄OCH₃ | C₂H₄OCH₃ | COOC₂H₅ | blue |
| 136 | C₂H₅ | C₂H₄OCH₃ | C₂H₄OCH₃ | COOH | blue |
| 137 | C₂H₅ | C₂H₄OCH₃ | C₂H₄OCH₃ | CONH₂ | blue |
| 138 | C₂H₅ | C₂H₄OCH₃ | C₂H₄OCH₃ | CONHCH₃ | blue |
| 139 | C₂H₄C₆H₅ | C₂H₄OCH₃ | C₂H₄OCH₃ | COOC₂H₅ | blue |
| 140 | C₂H₄C₆H₅ | C₂H₄OCH₃ | C₂H₄OCH₃ | COOH | blue |
| 141 | C₂H₄C₆H₅ | C₂H₄OCH₃ | C₂H₄OCH₃ | CONHCH₃ | blue |
| 142 | C₃H₆OCH₃ | C₂H₄OCH₃ | C₂H₄OCH₃ | COOH | blue |
| 143 | C₃H₆OCH₃ | C₂H₄OCH₃ | C₂H₄OCH₃ | CONH₂ | blue |
| 144 | C₃H₆OCH₃ | C₂H₄OCH₃ | C₂H₄OCH₃ | CONHCH₃ | blue |
| 145 | C₃H₆OCH₃ | C₂H₄OCH₃ | C₂H₄OCH₃ | COOC₄H₉ | blue |
| 146 | C₃H₆OCH₂C₆H₅ | C₂H₄OCH₃ | C₂H₄OCH₃ | COOC₄H₉ | blue |
| 147 | C₃H₆OC₂H₄C₆H₅ | C₂H₄OCH₃ | C₂H₄OCH₃ | COOC₄H₉ | blue |
| 148 | C₃H₆OC₂H₄OC₆H₅ | C₂H₄OCH₃ | C₂H₄OCH₃ | COOC₄H₉ | blue |
| 149 | C₃H₆OC₆H₁₁ | C₂H₄OCH₃ | C₂H₄OCH₃ | COOC₄H₉ | blue |
| 150 | C₃H₆OCH₃ | C₂H₅ | C₂H₅ | COOC₂H₅ | blue |
| 151 | C₃H₆OCOCH₃ | C₂H₅ | C₂H₅ | COOC₂H₅ | blue |
| 152 | C(CH₃)₃ | C₂H₅ | C₂H₅ | COOC₄H₉ | blue |
| 153 | C₂H₄C₆H₅ | C₂H₄OCH₃ | C₂H₄OCH₃ | COOC₄H₉ | blue |
| 154 | CH₂CH(OH)C₆H₅ | C₂H₄OCH₃ | C₂H₄OCH₃ | COOC₄H₉ | blue |
| 155 | C₃H₆OCH₂C₆H₅ | C₂H₅ | C₂H₅ | COOC₄H₉ | blue |
| 156 | C₃H₆OC₂H₄OC₆H₅ | C₂H₅ | C₂H₅ | COOC₄H₉ | blue |
| 157 | C₄H₈OH | C₂H₅ | C₂H₅ | COOC₄H₉ | blue |
| 158 | C₂H₅ | (C₂H₄O)₂CH₃ | (C₂H₄O)₂CH₃ | COOC₂H₅ | blue |
| 159 | CH₂CH=CH₂ | (C₂H₄O)₂CH₃ | (C₂H₄O)₂CH₃ | COOC₂H₅ | blue |
| 160 | C₃H₆OC₂H₄OCH₃ | C₂H₅ | C₂H₅ | COOC₂H₅ | blue |
| 161 | C₃H₆OC₂H₄OCH₃ | C₃H₇(n) | C₃H₇(n) | COOC₄H₉ | blue |
| 162 | C₃H₆OC₂H₄OCH₃ | C₂H₄OCH₃ | C₂H₄OCH₃ | COOC₄H₉ | blue |
| 163 | C₃H₆OC₂H₄OCH₃ | CH₃ | CH₃ | COOC₄H₉ | blue |
| 164 | C₃H₆OCH₃ | CH₃ | CH₃ | COOC₄H₉ | blue |
| 165 | C₂H₄OCH₃ | CH₃ | CH₃ | COOC₄H₉ | blue |
| 166 | CH(C₂H₅)CH₂OH | CH₃ | CH₃ | COOC₄H₉ | blue |
| 167 | CH(C₂H₅)CH₂OH | C₂H₅ | C₂H₅ | COOC₄H₉ | blue |
| 168 | CH(C₂H₅)CH₂OH | C₂H₄OCH₃ | C₂H₄OCH₃ | COOC₂H₅ | blue |
| 169 | C₃H₆OH | C₂H₄OCH₃ | C₂H₄OCH₃ | COOC₂H₅ | blue |
| 170 | C₃H₆OCOCH₃ | C₂H₄OCH₃ | C₂H₄OCH₃ | COOCH₃ | blue |
| 171 | CH₂CH=CH₂ | CH₃ | CH₃ | COOC₄H₉ | blue |
| 172 | CH₂CH=CH₂ | C₂H₅ | C₂H₅ | COOC₄H₉ | blue |
| 173 | CH₂CH(CH₃)OCOCH₃ | C₂H₄OCH₃ | C₂H₄OCH₃ | COOC₄H₉ | blue |
| 174 | C₃H₆OCH₃ | C₃H₆OCH₃ | C₂H₅ | CN | blue |
| 175 | C₃H₆OCH₃ | C₃H₆OCH₃ | C₂H₅ | COOC₂H₅ | blue |
| 176 | C₃H₆OCH₃ | C₃H₆OCH₃ | C₂H₅ | COOC₄H₉ | blue |
| 177 | C₃H₆OCH₃ | C₃H₆OCH₃ | C₂H₅ | COOH | blue |
| 178 | C₃H₆OCH₃ | C₃H₆OCH₃ | C₂H₅ | CONHCH₃ | blue |
| 179 | C₃H₆OCH₃ | C₂H₅ | C₂H₅ | COOC₄H₉ | blue |
| 180 | C₃H₆OCH₃ | C₂H₅ | C₂H₅ | COOH | blue |
| 181 | C₃H₆OCH₃ | C₂H₅ | C₂H₅ | CONH₂ | blue |
| 182 | C₃H₆OCH₃ | C₂H₅ | C₂H₅ | CONHCH₃ | blue |
| 183 | C₂H₅ | C₃H₆OCH₃ | C₂H₅ | CN | blue |
| 184 | C₂H₅ | C₃H₆OCH₃ | C₂H₅ | COOC₂H₅ | blue |
| 185 | C₂H₅ | C₃H₆OCH₃ | C₂H₅ | COOC₄H₉ | blue |
| 186 | C₂H₅ | C₃H₆OCH₃ | C₂H₅ | COOH | blue |

TABLE 3-continued

[Structure with Cl, CN, H3C, CN substituents; NC-C=CH- group with V, pyridone-azo-pyridine with NH-R1, N(R2)(R3)]

| Ex. No. | R¹ | R² | R³ | V | Hue on polyester |
|---------|-----|-----|-----|-----|------|
| 187 | C₂H₅ | C₃H₆OCH₃ | C₂H₅ | CONH₂ | blue |
| 188 | C₂H₅ | C₃H₆OCH₃ | C₂H₅ | CONHCH₃ | blue |
| 189 | C₃H₆OC₂H₄OC₆H₅ | C₂H₄OCH₃ | C₂H₄OCH₃ | CN | blue |
| 190 | C₃H₆OC₂H₄OC₆H₅ | C₂H₄OCH₃ | C₂H₄OCH₃ | COOC₂H₅ | blue |
| 191 | C₃H₆OC₂H₄OC₆H₅ | C₂H₄OCH₃ | C₂H₄OCH₃ | CONHCH₃ | blue |
| 192 | CH(CH₃)C₂H₅ | C₂H₅ | C₂H₅ | CN | blue |
| 193 | CH(CH₃)C₂H₅ | C₂H₅ | C₂H₅ | COOC₂H₅ | blue |
| 194 | CH(CH₃)C₂H₅ | C₂H₅ | C₂H₅ | COOC₄H₉ | blue |
| 195 | CH(CH₃)C₂H₅ | C₂H₄OCH₃ | C₂H₄OCH₃ | CN | blue |
| 196 | CH(CH₃)C₂H₅ | C₂H₄OCH₃ | C₂H₄OCH₃ | COOC₂H₅ | blue |
| 197 | CH(CH₃)C₂H₅ | C₂H₄OCH₃ | C₂H₄OCH₃ | COOC₄H₉ | blue |
| 198 | CH(CH₃)CH₂OCH₃ | C₂H₅ | C₂H₅ | CN | blue |
| 199 | CH(CH₃)CH₂OCH₃ | C₂H₅ | C₂H₅ | COOC₂H₅ | blue |
| 200 | CH(CH₃)CH₂OCH₃ | C₂H₅ | C₂H₅ | COOC₄H₉ | blue |
| 201 | CH(CH₃)CH₂OCH₃ | C₂H₅ | C₃H₆OCH₃ | CN | blue |
| 202 | CH(CH₃)CH₂OCH₃ | C₂H₅ | C₃H₆OCH₃ | COOC₂H₅ | blue |
| 203 | CH(CH₃)CH₂OCH₃ | C₂H₅ | C₃H₆OCH₃ | COOC₄H₉ | blue |
| 204 | CH(CH₃)CH₂OCH₃ | C₂H₅ | C₃H₆OC₂H₄OCH₃ | CN | blue |
| 205 | CH(CH₃)CH₂OCH₃ | C₂H₅ | C₃H₆OC₂H₄OCH₃ | COOC₂H₅ | blue |
| 206 | CH(CH₃)CH₂OCH₃ | C₂H₅ | C₃H₆OC₂H₄OCH₃ | COOC₄H₉ | blue |
| 207 | CH(CH₃)CH₂OCH₃ | C₂H₄OCH₃ | C₂H₄OCH₃ | CN | blue |
| 208 | CH(CH₃)CH₂OCH₃ | C₂H₄OCH₃ | C₂H₄OCH₃ | COOC₂H₅ | blue |
| 209 | CH(CH₃)CH₂OCH₃ | C₂H₄OCH₃ | C₂H₄OCH₃ | COOC₄H₉ | blue |
| 210 | C(CH₃)₂C₂H₅ | C₂H₄OCH₃ | C₂H₄OCH₃ | CN | blue |
| 211 | C(CH₃)₂C₂H₅ | C₂H₄OCH₃ | C₂H₄OCH₃ | COOC₂H₅ | blue |
| 212 | C(CH₃)₂C₂H₅ | C₂H₄OCH₃ | C₂H₄OCH₃ | COOC₄H₉ | blue |
| 213 | CH(CH₃)CH₂OCH₃ | C₃H₇ | C₃H₆OCH₃ | CN | blue |
| 214 | CH(CH₃)CH₂OCH₃ | C₃H₇ | C₃H₆OCH₃ | COOC₂H₅ | blue |
| 215 | CH(CH₃)CH₂OCH₃ | C₃H₇ | C₃H₆OCH₃ | COOC₄H₉ | blue |
| 216 | CH(CH₃)CH₂OCH₃ | C₃H₇ | C₃H₆OC₂H₄OCH₃ | CN | blue |
| 217 | CH(CH₃)CH₂OCH₃ | C₃H₇ | C₃H₆OC₂H₄OCH₃ | COOC₂H₅ | blue |
| 218 | CH(CH₃)CH₂OCH₃ | C₃H₇ | C₃H₆OC₂H₄OCH₃ | COOC₄H₉ | blue |
| 219 | CH(CH₃)CH₂OCH₃ | C₃H₇ | C₃H₆OC₂H₄OC₂H₅ | CN | blue |
| 220 | CH(CH₃)CH₂OCH₃ | C₃H₇ | C₃H₆OC₂H₄OC₂H₅ | COOC₂H₅ | blue |
| 221 | CH(CH₃)CH₂OCH₃ | C₃H₇ | C₃H₆OC₂H₄OC₂H₅ | COOC₄H₉ | blue |
| 222 | CH(CH₃)CH₂OCH₃ | C₂H₅ | C₃H₆OC₂H₄OC₂H₅ | CN | blue |
| 223 | CH(CH₃)CH₂OCH₃ | C₂H₅ | C₃H₆OC₂H₄OC₂H₅ | COOC₂H₅ | blue |
| 224 | CH(CH₃)CH₂OCH₃ | C₂H₅ | C₃H₆OC₂H₄OC₂H₅ | COOC₄H₉ | blue |
| 225 | CH(CH₃)CH₂OCH₃ | C₃H₆OCH₃ | C₃H₆OCH₃ | CN | blue |
| 226 | CH(CH₃)CH₂OCH₃ | C₃H₆OCH₃ | C₃H₆OCH₃ | COOC₂H₅ | blue |
| 227 | CH(CH₃)CH₂OCH₃ | C₃H₆OCH₃ | C₃H₆OCH₃ | COOC₄H₉ | blue |

TABLE 4

[Structure with Cl, CN, CH₃, CN substituents; W=CH- group, azo-linked pyridone-pyridine with NHR¹, N(R²)(R³)]

| Ex. No. | R¹ | R² | R³ | W | Hues on polyester |
|---------|-----|-----|-----|-----|------|
| 228 | C₃H₆OCH₃ | C₂H₄OCH₃ | C₂H₄OCH₃ | 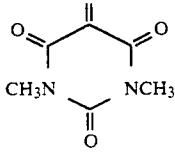 | blue |

TABLE 4-continued

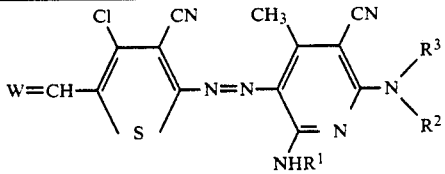

| Ex. No. | R¹ | R² | R³ | W | Hues on polyester |
|---|---|---|---|---|---|
| 229 | $C_3H_6OCH_3$ | $C_2H_4OCH_3$ | $C_2H_4OCH_3$ | 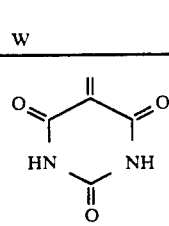 | blue |
| 230 | $C_3H_6OCH_3$ | $C_3H_6OCH_3$ | $C_2H_5$ | 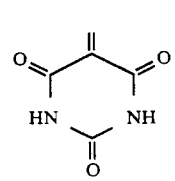 | blue |
| 231 | $C_3H_6OCH_3$ | $C_3H_6OCH_3$ | $C_2H_5$ | 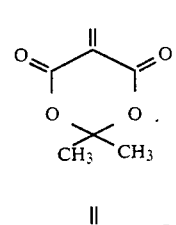 | blue |
| 232 | $C_2H_5$ | $C_2H_4OCH_3$ | $C_2H_4OCH_3$ | 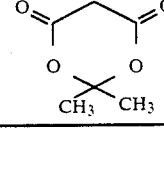 | blue |

We claim:

1. A process for dyeing and printing textile materials with azo dyes, which comprises applying thereto an azo dye of the formula Ia

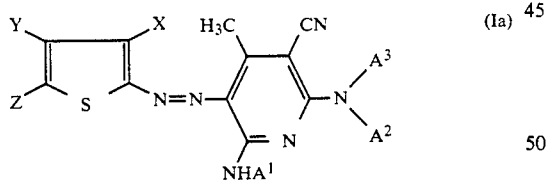

where
X is cyano or a radical of the formula $COOQ^1$ or $CONQ^1Q^2$, wherein $Q^1$ and $Q^2$ are identical or different and singly are, independently of one another, substituted or unsubstituted $C^1$-$C^{12}$-alkyl with or without interruption by from 1 to 3 oxygen atoms in ether function, $C_5$-$C_7$-cycloalkyl, $C_3$-$C_4$-alkenyl, or substituted or unsubstituted phenyl, or together are, together with the nitrogen atom joining them, a 5- or 6-membered saturated heterocyclic radical with or without further hetero atoms or else $Q^2$ may be hydrogen, Y is $C_1$-$C_6$-alkylthio, $C_1$-$C_6$-alkylsulfonyl, halogen, substituted or unsubstituted phenoxy, substituted or unsubstituted phenylthio or substituted phenylsulfonyl, with the proviso that Y is not —Br, Z is cyano, nitro, substituted or unsubstituted phenylsulfonyl, $C_1$-$C_6$-alkylsulfonyl, formyl or a radical of the formula —CH=T, wherein T is the radical of an acidic-CH compound, and $A^1$, $A^2$ and $A^3$ are identical or different and singly are, independently of one another, substituted or unsubstituted $C_1$-$C_{12}$-alkyl, with or without interruption by from 1 to 3 oxygen atoms in ether function, $C_5$-$C_7$-cycloalkyl, substituted or unsubstituted phenyl, $C_3$-$C_6$-alkenyl, substituted or unsubstituted benzoyl, $C_1$-$C_8$-alkanoyl, $C_1$-$C_8$-alkylsulfonyl or substituted or unsubstituted phenylsulfonyl, or $A^2$ and $A^3$ together are, together with the nitrogen atom joining them, a 5- or 6-membered saturated heterocyclic radical with or without further hetero atoms.

2. The process for dyeing and printing textile materials according to claim 1, wherein the azo dye of the formula Ia is

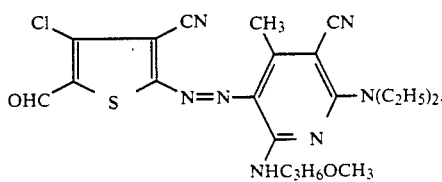

3. The process for dyeing and printing textile materials according to claim 1, wherein the azo dye of the formula Ia is

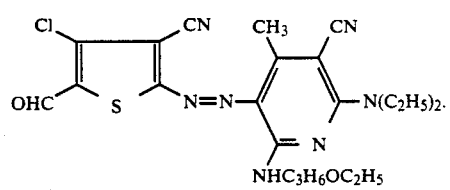

4. The process for dyeing and printing textile materials according to claim 1, wherein the azo dye of the formula Ia is

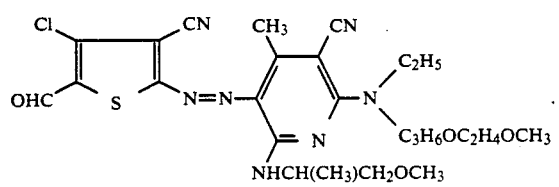

5. The process for dyeing and printing textile materials according to claim 1, wherein the azo dye of the formula Ia is

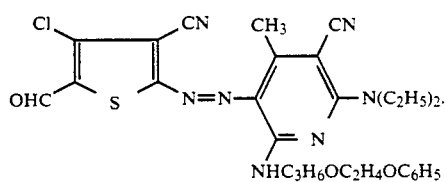

6. The process for dyeing and printing textile materials according to claim 1, wherein the azo dye of the formula Ia is

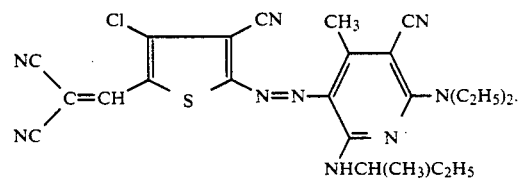

7. The process for dyeing and printing textile materials according to claim 1, wherein the azo dye of the formula Ia is

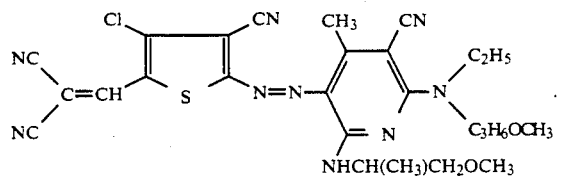

8. The process for dyeing and printing textile materials according to claim 1, wherein the azo dye of the formula Ia is

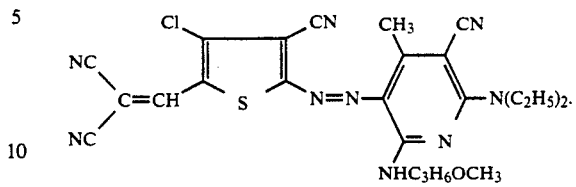

9. The process for dyeing and printing textile materials according to claim 1, wherein the azo dye of the formula Ia is

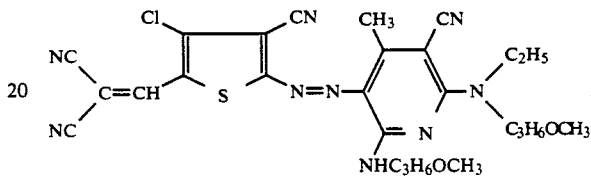

10. The process for dyeing and printing textile materials according to claim 1, wherein the azo dye of the formula Ia is

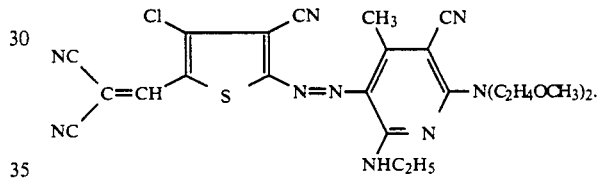

11. The process for dyeing and printing textile materials according to claim 1, wherein the azo dye of the formula Ia is

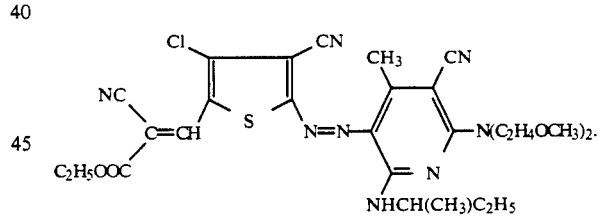

12. The process for dyeing and printing textile materials according to claim 1, wherein the azo dye of the formula Ia is

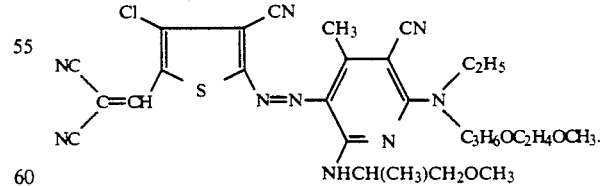

* * * * *

UNITED STATES PATENT AND TRADEMARK OFFICE
CERTIFICATE OF CORRECTION

PATENT NO. : 5,330,543
DATED : July 19, 1994
INVENTOR(S) : Guenter HANSEN, et al.

It is certified that error appears in the above-indentified patent and that said Letters Patent is hereby corrected as shown below:

On the title page, Item [30], the Foreign Application Priority Date should read as follows:

—Nov. 23, 1991—

Also on the title page, Item [75], the 6th inventor's city should read as follows:

—Bad Duerkheim—

Signed and Sealed this

Twenty-seventh Day of September, 1994

Attest:

BRUCE LEHMAN

Attesting Officer     Commissioner of Patents and Trademarks